United States Patent
Dalrymple et al.

(10) Patent No.: US 7,847,974 B2
(45) Date of Patent: Dec. 7, 2010

(54) SYSTEMS AND METHODS FOR DYNAMICALLY LIMITING TOTAL COLORANT COVERAGE IN A COLOR RENDERING SYSTEM

(75) Inventors: John Charles Dalrymple, Portland, OR (US); James Zhixin Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1139 days.

(21) Appl. No.: 10/892,845

(22) Filed: Jul. 16, 2004

(65) Prior Publication Data

US 2006/0012811 A1 Jan. 19, 2006

(51) Int. Cl.
*G06F 15/00* (2006.01)
(52) U.S. Cl. .......................... 358/1.9; 358/2.1; 358/504; 358/518; 358/515; 382/165; 382/276; 382/278
(58) Field of Classification Search .................. 358/1.9, 358/2.1, 504, 518, 515; 382/165, 276, 278
See application file for complete search history.

(56) References Cited

U.S. PATENT DOCUMENTS 6,923,523 B2   8/2005   Nishikawa et al.

2002/0102019 A1*   8/2002   Piatt et al. .................... 382/165
2003/0020931 A1*   1/2003   Harrington .................. 358/1.9

FOREIGN PATENT DOCUMENTS

JP   2004-58626   2/2004

* cited by examiner

*Primary Examiner*—David K Moore
*Assistant Examiner*—Quang N Vo
(74) *Attorney, Agent, or Firm*—Kirton & McConkie; Michael F. Krieger; Adam D. Stevens

(57) ABSTRACT

Systems and methods for dynamically limiting total colorant coverage in multi-colorant rendering. Two polyhedra are defined: one contains all the colors that exceed the total colorant limit, and another is within the colorant limit that contains the results of the colorant limitation process. Data is received to identify a specified contone color, which is processed to decide whether it is inside one of the polyhedra. If the specified contone color is not within either polyhedra, the specified contone color is used in the rendering process. Alternatively, if the specified contone color is within one of the polyhedra, the value representing the specified contone color is compressed into the second polyhedra volume to obtain a resultant contone color that is used in the rendering process.

25 Claims, 6 Drawing Sheets

SYSTEMS AND METHODS FOR DYNAMICALLY LIMITING TOTAL COLORANT COVERAGE IN A COLOR RENDERING SYSTEM

BACKGROUND OF THE INVENTION

1. Field of the Invention

The present invention relates to multi-colorant rendering. In particular, the present invention relates to systems and methods for dynamically limiting total colorant coverage in a color rendering system.

2. Background and Related Art

Current color printing technologies available to consumers include color printers that use various color combinations to reproduce any of a variety of colors. One such example is a color ink jet printer that propels droplets of ink directly onto paper. Low-end ink jet printers typically employ three ink colors (cyan, magenta and yellow) to form the various color combinations to reproduce a variety of colors. For example, three-color ink jet printers produce a composite black. Four-color ink jet printers use cyan, magenta, yellow and black.

A variety of different kinds of paper may be used in association with an ink jet printer. However, each type of paper includes characteristics that affect the printing on the particular paper. For example, clay-coated and other specialty papers greatly improve the printed results when compared to regular copy paper because the clay-coated or other specialty paper does not absorb the ink like the regular copy paper.

While color ink jet printers are available for use, problems still exist. The printing of a color image typically includes applying a number of colorants to the paper or output media. The color that is produced on the output media is dependent on the amount of each colorant cyan, magenta, yellow and black ink or toner that is applied to the output media. The amount of a colorant can be expressed as a percentage of up to a maximum amount of colorant that could be deposited by a deposition apparatus. For example, a color can be expressed as a percentage of cyan, magenta, yellow and black colorants. Each colorant can be up to 100%. The total amount of colorant applied to a given region of an output medium is the combined amounts of cyan, magenta, yellow and black, thus up to 400% (100% of each colorant). However, the output media typically includes a total area coverage (TAC) limit for the applied ink. The TAC limit represents the total amount of colorant that can be applied to a given area of the output media up to a saturation level. Such limits may be dependent on the type of media used for printing, such as the type of paper. Thus, if the total color combination exceeds the total area coverage limit the media is over-inked, which may cause mechanical problems, image quality problems, drying problems, etc.

Thus, while techniques currently exist that are used to provide color printing, challenges still exist, including mechanical problems, image quality problems, drying problems, and the like. Accordingly, it would be an improvement in the art to augment or even replace current techniques with other techniques.

SUMMARY OF THE INVENTION

The present invention relates to multi-colorant rendering. In particular, the present invention relates to systems and methods for dynamically limiting total colorant coverage in a color rendering system. Moreover, the present invention relates to systems and methods for dynamically limiting total colorant coverage in multi-colorant subtractive rendering.

Implementation of the present invention takes place in association with the transformation of a specified contone color to create a second or resultant contone color in which the sum of the colorant components is limited to being within a specified maximum value. Accordingly, the transformed resultant contone color is output within the total colorant coverage limit.

In at least some implementations, a computer device is utilized to create the second or resultant color. Accordingly, once data is received that identifies the specified contone color, it is compared to the color limit. In at least one implementation, a polyhedron is defined that includes, but is not limited to, all colors exceeding the total area coverage (TAC) amount. All colors inside or on the polyhedron are altered, and any colors outside of the polyhedron are not altered.

While the methods and processes of the present invention have proven to be particularly useful in association with ink jet printers, those skilled in the art can appreciate that the methods and processes can be used in a variety of different applications and in a variety of different processes, such as in electrophotographic (EP) engines and any other printing process, to limit the total colorant coverage in multi-colorant subtractive rendering. Examples include printers, copiers, fax machines, plotters, multi-functional peripherals, monitors, etc. that employ multi-colorant subtractive rendering.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to multi-colorant rendering. In particular, the present invention relates to systems and methods for dynamically limiting total colorant coverage in a color rendering system. Moreover, at least some embodiments of the present invention relate to systems and methods for dynamically limiting total colorant coverage in multi-colorant subtractive rendering.

Embodiments of the present invention takes place in association with the transformation of a specified contone color to create a second or resultant contone color in which the sum of the colorant components is limited to a specified maximum value. Accordingly, the transformed resultant contone color is output within the total colorant coverage limit.

In some embodiments, a computer device is utilized to create the second or resultant color. Accordingly, disclosure relating to a computer device is provided below. Once data is received at a computer device to identify a specified contone color, it is processed to decide whether it needs to be modified. In at least one embodiment, a polyhedron is defined that includes, but is not limited to, all colors exceeding the total area coverage (TAC) amount. All colors inside or on the polyhedron are altered, and any colors outside of the polyhedron are not altered.

The following disclosure of the present invention is grouped into two subheadings, namely "Exemplary Operating Environment" and "Dynamically Limiting Total Colorant Coverage." The utilization of the subheadings is for convenience of the reader only and is not to be construed as limiting in any sense.

Exemplary Operating Environment

Figure 1:
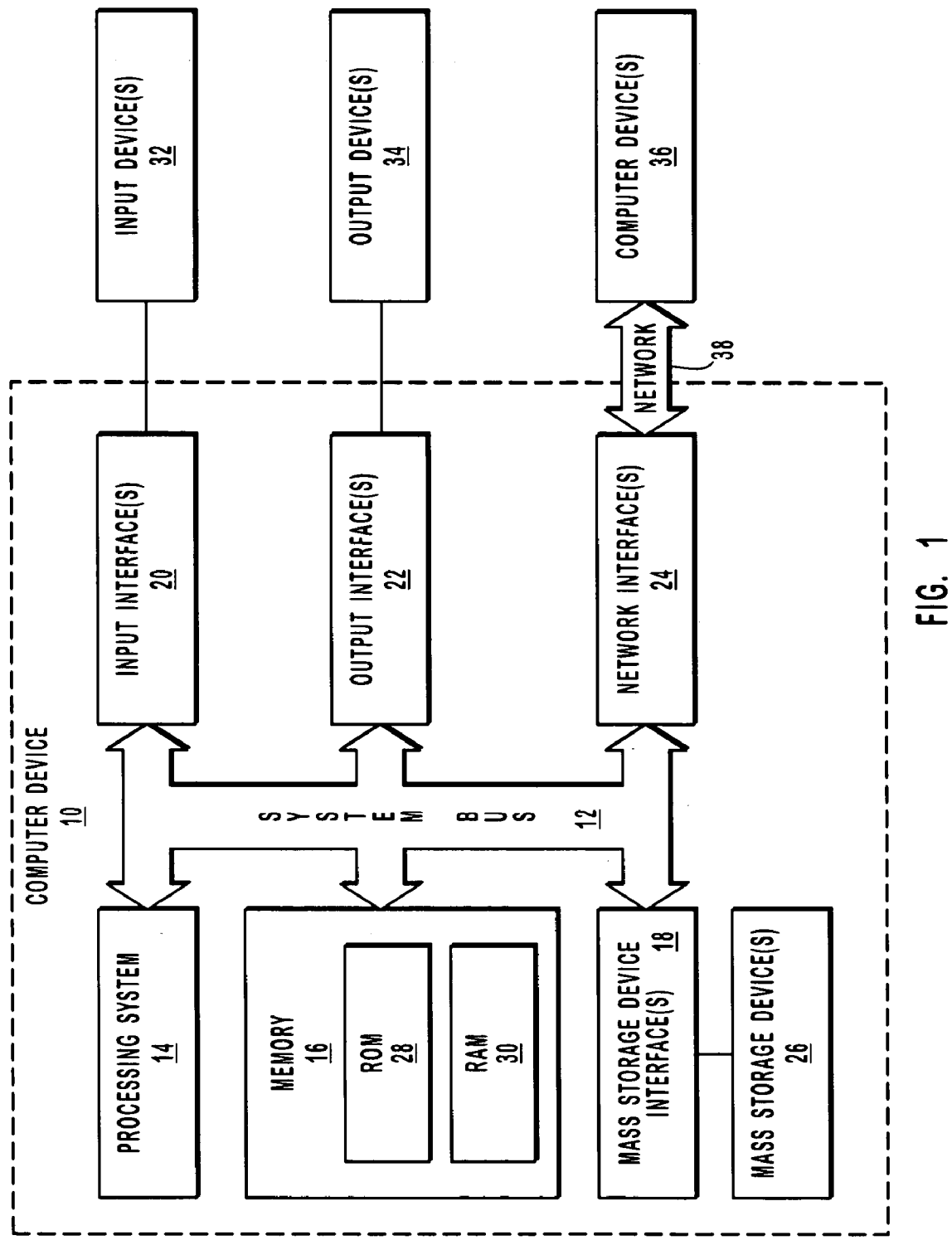
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Those skilled in the art will appreciate that embodiments of the present invention embrace a variety of different system configurations. For example, in one embodiment the system configuration includes an output device (e.g., a multifunctional peripheral (MFP) or other printer/plotter, a copy machine, a facsimile machine, a monitor, etc.) that performs multi-colorant subtractive rendering. In another embodiment, the system configuration includes one or more client computer devices, optionally one or more server computer devices, and a connection or network communication that enables the exchange of communication to an output device, which is configured to perform multi-colorant subtractive rendering.

Figure 2:
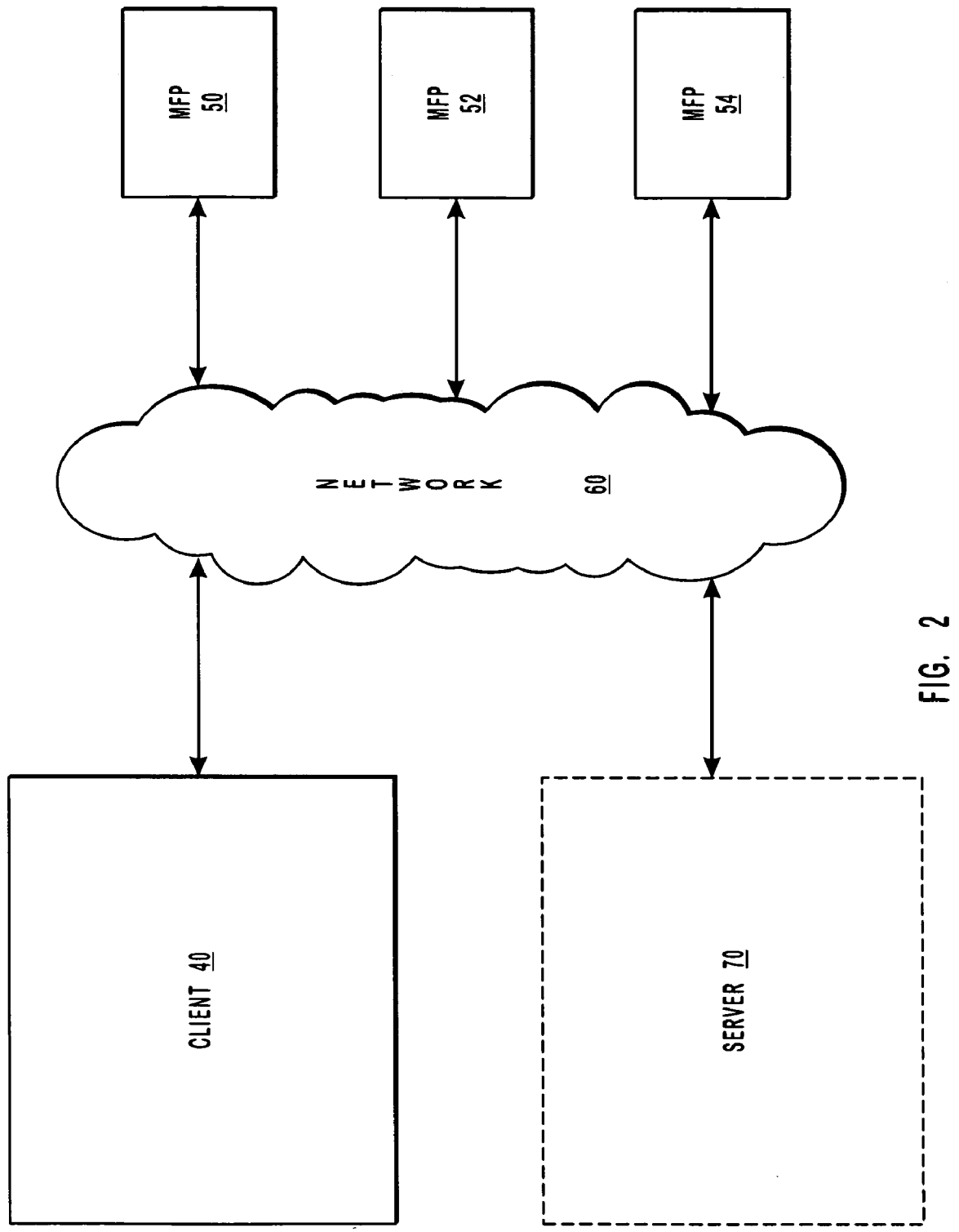
FIG. 2 illustrates a representative networked system configuration.

Thus, while those skilled in the art will appreciate that embodiments of the present invention may be practiced in a variety of different environments with many types of system configurations, FIG. 2 provides a representative networked system configuration that may be used in association with the present invention. While FIG. 2 illustrates an embodiment that includes a client, three multifunctional peripherals (MFPs), and optionally a print server connected to a network, alternative embodiments include more than one client, less than three MFPs, more than three MFPs, no server, and/or more than one server connected to a network. Other embodiments of the present invention include local, networked, or peer-peer subtractive rendering environments where one or more computer devices are connected to one or more subtractive rendering devices. Moreover, embodiments in accordance with the present invention also embrace a single electronic consumer device, wireless networked environments, and/or wide area networked environments, such as the Internet.

The representative system of FIG. 2 includes a computer device, illustrated as client 40, which is connected to a plurality of peripheral devices (illustrated as MFP 50, MFP 52, and MFP 54) across network 60. In FIG. 2, MFPs 50-54 may be any type of device that employs subtractive rendering.

While MFPs 50-54 are connected to network 60, embodiments of the present invention embrace the use of peripheral devices (e.g., MFPs) that are locally connected to a computer device, that are embedded, that are configured in a peer-to-peer printing environment, or that are configured in a wireless network environment.

Thus, in accordance with the illustrated embodiment and other embodiments of the present invention, limiting total colorant coverage in multi-colorant subtractive rendering is performed. In particular, embodiments of the present invention relate to systems and methods for transforming a specified contone color to create a second or resultant contone color in which the sum of the colorant components is limited to a specified maximum value. Accordingly, the transformed color is output having the total colorant coverage limit, as will be further described below.

Dynamically Limiting Total Colorant Coverage

As provided above, the present invention relates to multi-colorant rendering. In particular, the present invention relates to systems and methods for dynamically limiting total colorant coverage in a color rendering system. Moreover, embodiments of the present invention relate to systems and methods for dynamically limiting total colorant coverage in multi-colorant subtractive rendering.

Rendering a color image typically includes transferring, applying or otherwise adding a number of colorants (e.g., cyan, magenta, yellow and black ink, toner, dye, pigment or another color source) to an output medium (e.g., paper, a slide, an overhead transparency, a screen, or any other output media). The color reproduced on the output medium is dependent on the percentage of each colorant applied to the output medium. The amount of a colorant can be expressed as a percentage of a maximum amount that can be deposited by a deposition apparatus. For example, a color can be expressed as a percentage of cyan, magenta, yellow and black (CMYK) colorants. Each colorant may be up to 100%. The total amount of colorant applied to a given region of an output medium is the combined amounts of all of the colorants. Thus, the total amount of the sum of all colorants added can be up to 400% in a four-colorant system (CMYK) or 300% in a three-colorant system (CMY). The total amount of the sum of all colorants added is typically referred to as the total area coverage (TAC) amount.

A total area coverage (TAC) limit represents a maximum amount of colorant that can be applied to a given area of the output medium. The TAC limit can also be expressed as a percentage, and is typically less than the maximum amount of all colorants (300% in a three-colorant system or 400% in a four-colorant system). Exceeding the TAC limit value results in over-inking, bleeding, running, smearing, mechanical problems, tearing, having the colorant not adhere to the output medium, waste of colorant, etc. Thus, in at least some embodiments, a polyhedron is defined that includes, but is not limited to, all colors exceeding the TAC amount. All colors inside or on the polyhedron are altered, and any colors outside of the polyhedron are not altered, as will be further explained below. In at least some embodiments of the present invention, a specified contone color that is denoted in device process color coordinates, such as CMYK, is dynamically used to obtain a second or resultant contone color in which the sum of the colorant (e.g., ink, toner, dye or color source) components is limited to being with a specified maximum value (the TAC limit). The transformed color is then safely used in a subtractive rendering system having that TAC limit. Embodiments of the present invention limit the TAC amount while avoiding clipping as well as gamut loss.

In halftone offset printing processes there is typically a TAC limit (e.g., 280%) for ink that is to be applied. Such limits may be media-type dependent. Similar limits often apply to inkjet, electrophotographic and other color printing or rendering processes. In the present example, any CMYK combination where C+M+Y+K exceeds 280% will over-ink the output medium (e.g., paper or other output media) and may cause mechanical, image quality or drying problems depending on the particular rendering process. When a subtractive rendering process includes a specified TAC limit but also needs to be able to render arbitrary data (specified as up to 100% of each colorant), the data to be rendered may first be pre-processed to in order to avoid such problems.

By way of example, the colors processed by some embodiments of the present invention may be those of pixels within a raster image derived either from data sensed by an image, capture device, or from a rasterization process applied to a higher-level geometric or textual graphic primitive. Alternatively, they may be applied to graphic primitive attributes (e.g., line color, text color, fill color etc.) where the color conversion occurs prior to rasterization to a pixel-based representation. They may also be used within a process for generating color conversion lookup tables (LUTs).

Embodiments of the present invention limit colorant amounts in an n-primary subtractive system, where $n \geq 2$. Thus, for example, n=3 for a CMY process and n=4 for a CMYK process. Those skilled in the art will appreciate that embodiments of the present invention embrace a variety of different strategies. For example, in at least one embodiment, the K component is preserved and the CMY components are limited.

Embodiments of the present invention embrace subtractive rendering systems where colorants are laid down on a medium and a restriction exists as to the amount of colorant that the medium will absorb or can be applied thereon prior to saturation. Such subtractive systems include printing systems, subtractive LCD screens, etc. In at least some embodiments of the present invention, the term "contone" signifies independent of or before any halftoning process.

Figure 3:
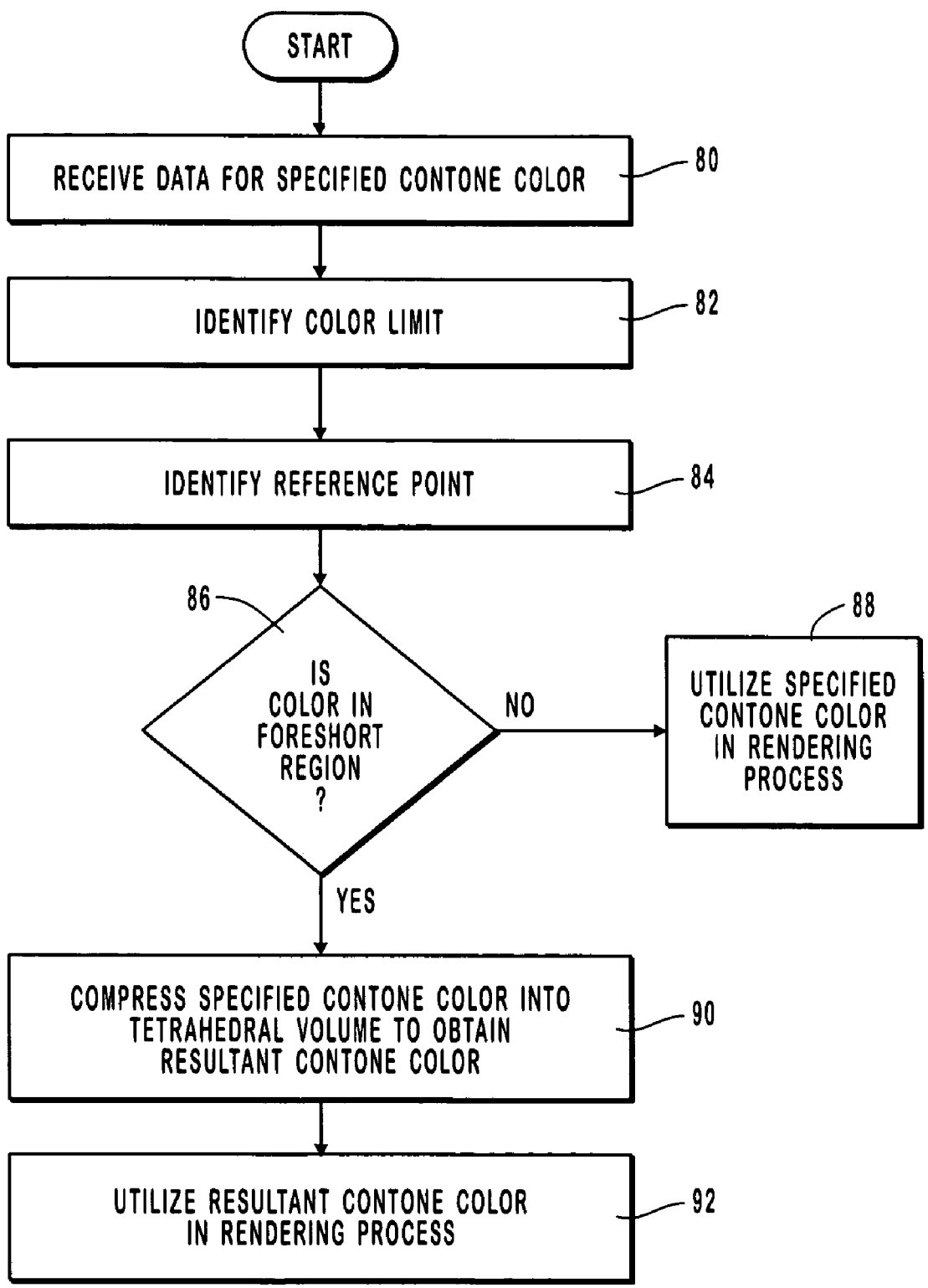
FIG. 3 illustrates a representative embodiment of processing in accordance with the present invention.

With reference now to FIG. 3, a flow chart is illustrated that provides representative processing used to limit total colorant coverage in multi-colorant subtractive rendering in accordance with the present invention. In FIG. 3, execution begins at step 80 where data is received corresponding to a specified contone color. Execution then proceeds to step 82, which identifies a particular TAC limit.

At Block 84, a reference point is identified. This reference point defines the resultant polyhedron into which the input colors exceeding the limit are compressed. The "Foreshort Region" in Block 86 of FIG. 3 is the union of this resultant polyhedron and the polyhedron that contains all the colors exceeding the colorant limit. If it is determined at decision block 86 that the specified contone color is outside the "Foreshort Region", execution proceeds to step 88 where the specified contone color is utilized in the rendering process. Alternatively, if it is determined at decision block 86 that the specified contone color is inside the "Foreshort Region", proceeds to step 90, where it will be foreshortened or compressed.

Figure 4:
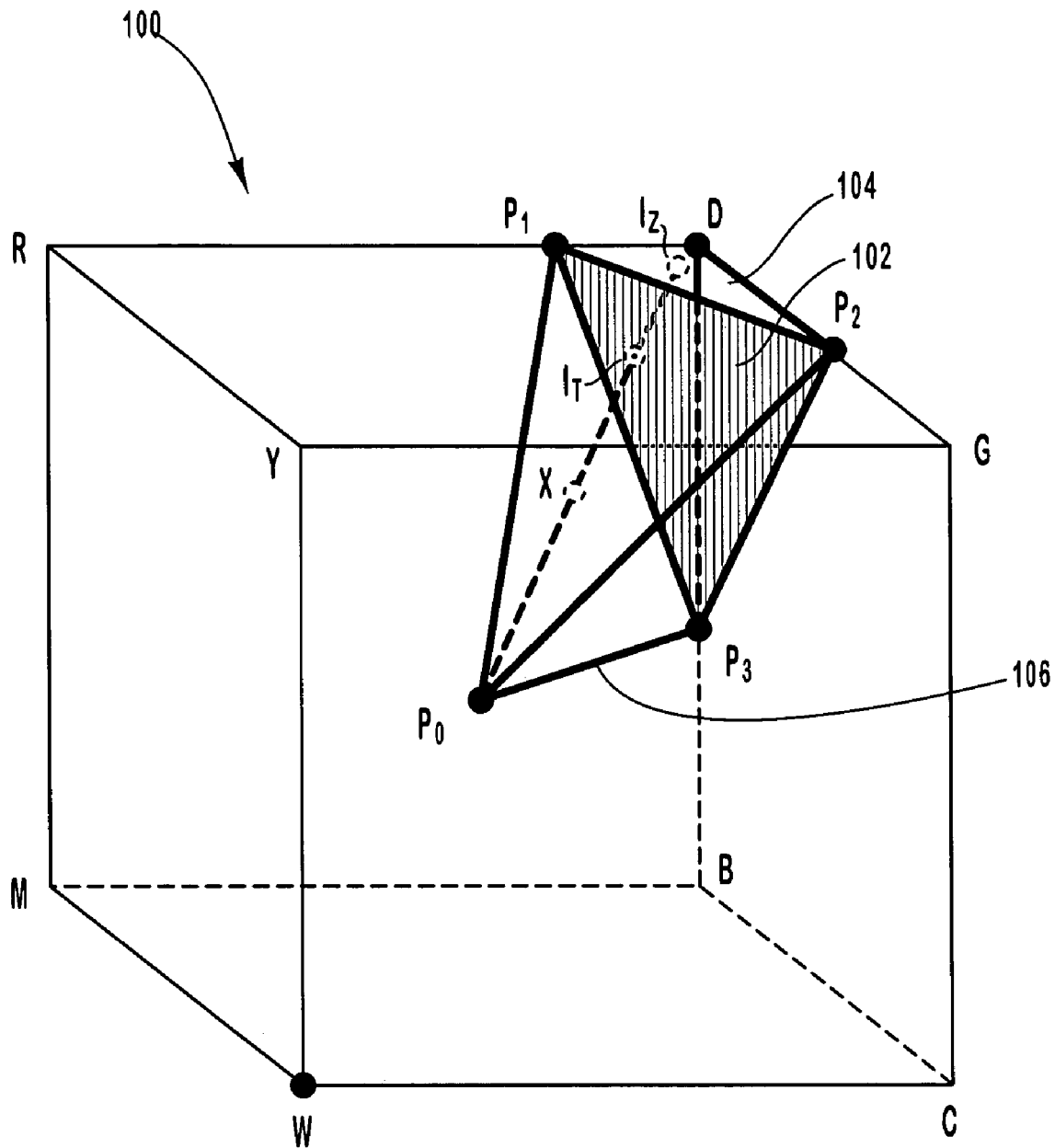
FIG. 4 illustrates a graphical representation of the representative embodiment of FIG. 3.

With reference now to FIG. 4, a graphical representation of a three colorant (CMY) system is illustrated as cube 100. In FIG. 4, the reference point identified in step 84 of FIG. 3 is illustrated in FIG. 4 as $P_0$, which is a reference point located inside of cube 100. In at least some embodiments, $P_0$ is a design parameter that is almost arbitrary. $P_0$ provides another degree of freedom, and is the origin of the working space in which is performed a foreshortening or compression (step 90 of FIG. 3), as will be explained below.

In the present embodiment $P_0$ lies within a line segment (not shown) between vertices W and D of cube 100. The closer $P_0$ is to W, more of the colors of cube 100 will be modified. Alternatively, the closer $P_0$ is to the vertex D the less volume is allocated to region 106, which contains the results of the foreshortening.

Returning back to FIG. 3, after it is decided that the input color is inside the "Foreshort Region" at step 86, execution proceeds to step 90, where the vector from the reference point to the specified contone color is compressed or foreshortened in magnitude but unchanged in direction. In the present embodiment, the said vector is compressed or foreshortened such that the tip of the resultant vector lies within a polyhedral volume having the reference point as a vertex, as will be demonstrated below.

With reference back to FIG. 4, a ray is projected from $P_0$ through the specified input color X and through triangle $P_1P_2P_3$, which corresponds to TAC limit 102. Thus, any color that resides in region 104 exceeds TAC limit 102. Accordingly, any vector in region 104 is compressed or foreshortened so as to reside within region 106, which is within TAC limit 102. Thus, region 106 is the resultant polyhedron and the union of regions 106 and 104 comprises the "Foreshort Region". In FIG. 4, $I_t$ is the intersection with triangle $P_1P_2P_3$ and $I_Z$ is the intersection with the surface of cube 100.

Thus, in accordance with at least some embodiments of the present invention, the compressing (provided as step 90 of FIG. 3) or foreshortening includes forming a ratio between the length from $P^0$ to $I_t$ and the length from $P_0$ to $I_Z$. The ratio is used to foreshorten the vector from $P_0$ to X, wherein the X is the input color and may be anywhere on the line from $P_0$ to $I_Z$, within or outside of TAC limit 102 (triangle $P_1P_2P_3$). When the input color is in region 104 or 106, the vector from the reference point to the input color is foreshortened. Accordingly, the present embodiment maps the outer surface of a volume that includes the three triangles $DP_1P_2$, $DP_2P_3$ and $DP_1P_3$ onto triangle $P_1P_2P_3$. Everything is thus foreshortened within the volume, thereby warping or compressing the polyhedron $P_0P_1P_2P_3D$ (the union of regions 104 and 106) into the polyhedron $P_0P_1P_2P_3$ (region 106)

Accordingly, in the three-colorant (CMY) system illustrated in FIG. 4, triangle $P_1P_2P_3$ is perpendicular to the line connecting points W and D. This triangle 102 lies in the plane C+M+Y=L (where L is the TAC limit of the CMY printing process), which divides the excess-colorant region 104 from the remainder of the CMY cube 100. That is, any colors within polyhedron $P_1P_2P_3D$, if not limited, would deposit excess colorant. For these colors, C+M+Y>L, where L is the TAC limit of the CMY printing process. To avoid clipping, a reference point is identified empirically or by design ($P_0$) inside of the CMY cube 100, and embodiments of the present invention bijectively map (compress) all colors within the polyhedral volume $P_0P_1P_2P_3D$ into the polyhedral volume $P_0P_1P_2P_3$. As provided above, a choice for $P_0$ might be a point along the line segment connecting points W and D, but other points can be used.

Before discussing the compression procedure in more detail, the following is provided: X is an input CMY color and X' is the CMY color output in accordance with the present invention. V is a ray emanating from $P_0$ and passing through X. $I_T$ is the point of intersection between the ray V and triangle $P_1P_2P_3$. Z is a point set comprising the union of triangles $DP_1P_2$, $DP_2P_3$ and $DP_3P_1$. This set is that portion of the outermost surface of the CMY cube 100 where the total colorant limit is exceeded. $I_z$ is the point of intersection between the ray V and the set Z.

A distance between arbitrary points $J_1$ $_{and J2}$ is denoted as $(J_1,J_2)$. Any convenient distance metric (e.g. $L_p$-metric) may be used. In visualizing the geometry associated with the calculations of the method, it may be helpful to use the Euclidean ($L_2$) distance metric.

With reference to the embodiment of FIG. 4 and the above definitions, the compression/foreshortening proceeds as follows: If X does not lie within polyhedron $P_0P_1P_2P_3D$ then the output color X'=X and the specified contone color is used in the rendering process (step 88 of FIG. 3). Otherwise: $\alpha=(P_0I_T)/(P_0I_z)$ and the output color X'=$P_0+\alpha(X-P_0)$. The output color (resultant contone color) is then utilized in the rendering process (step 92 of FIG. 3).

In another exemplary embodiment, a function f is applied to $\alpha$ prior to the copmpression/foreshortening step. That is, $\alpha$ is first calculated as described above: $\alpha=(P_0I_T)/(P_0I_z)$. Then a function f is applied to calculate $\alpha'=f(\alpha)$. Then the output color X' is calculated as X'=$P_0+\alpha'$ $(X-P_0)$. An exemplary function f has the properties that $f(0)=0$, $f(1)=1$, and $f(x)$ is monotonically increasing on the interval $0<x<1$.

In a four colorant (CMYK) system, the TAC limit ($L_{CMYK}$) applies to the combination of all four colorants. The following is one way of preserving the K component in accordance with the present invention. Those skilled in the art will appreciate that embodiments of the present invention embrace other strategies, including using the embodiment discussed above with n=4.

When using a K-preserving strategy, the K component is not adjusted. Instead, a TAC limit is computed for CMY ($L_{CMY}$) as $L_{CMY}=L_{CMYK}-K$. Then, the procedure is applied as described above for the CMY case (n=3), where $L=L_{CMY}$.

Figure 5:
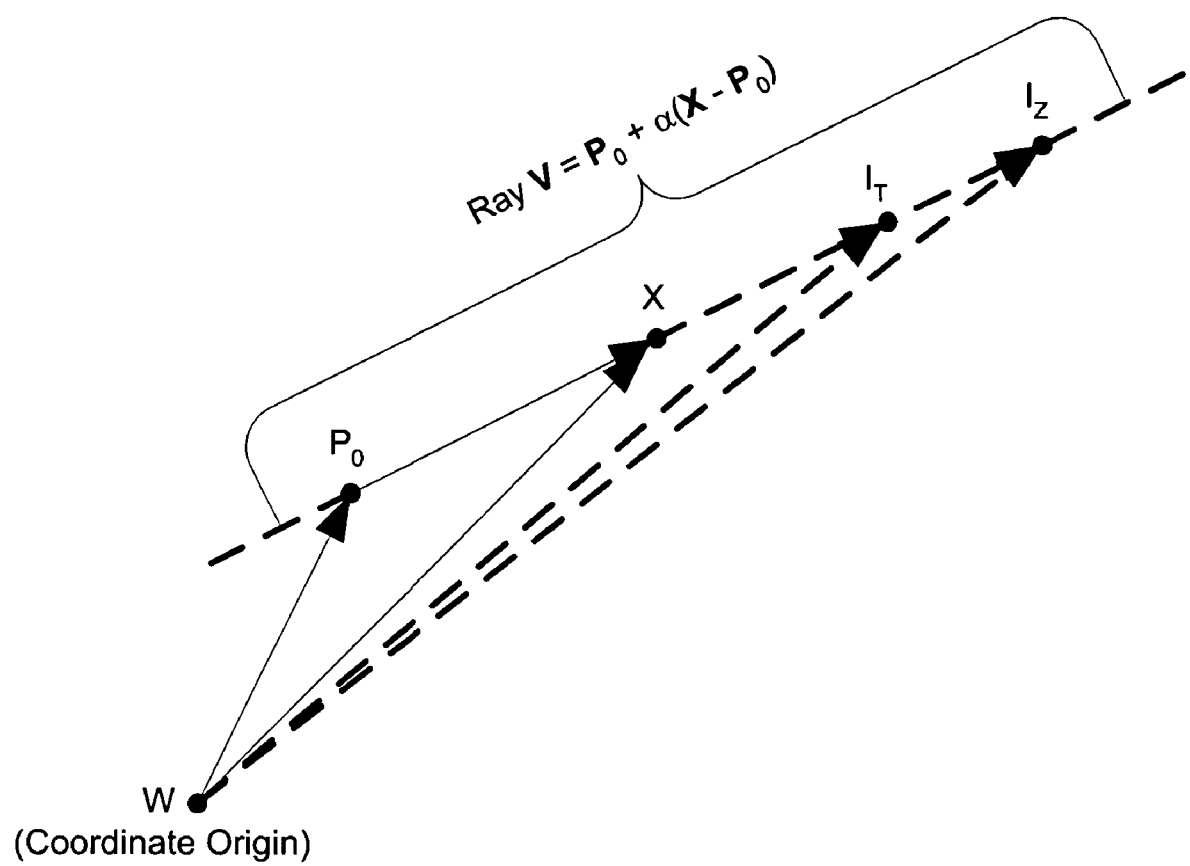
FIG. 5 is a diagram of a representative n-dimension embodiment.
Figure 6:
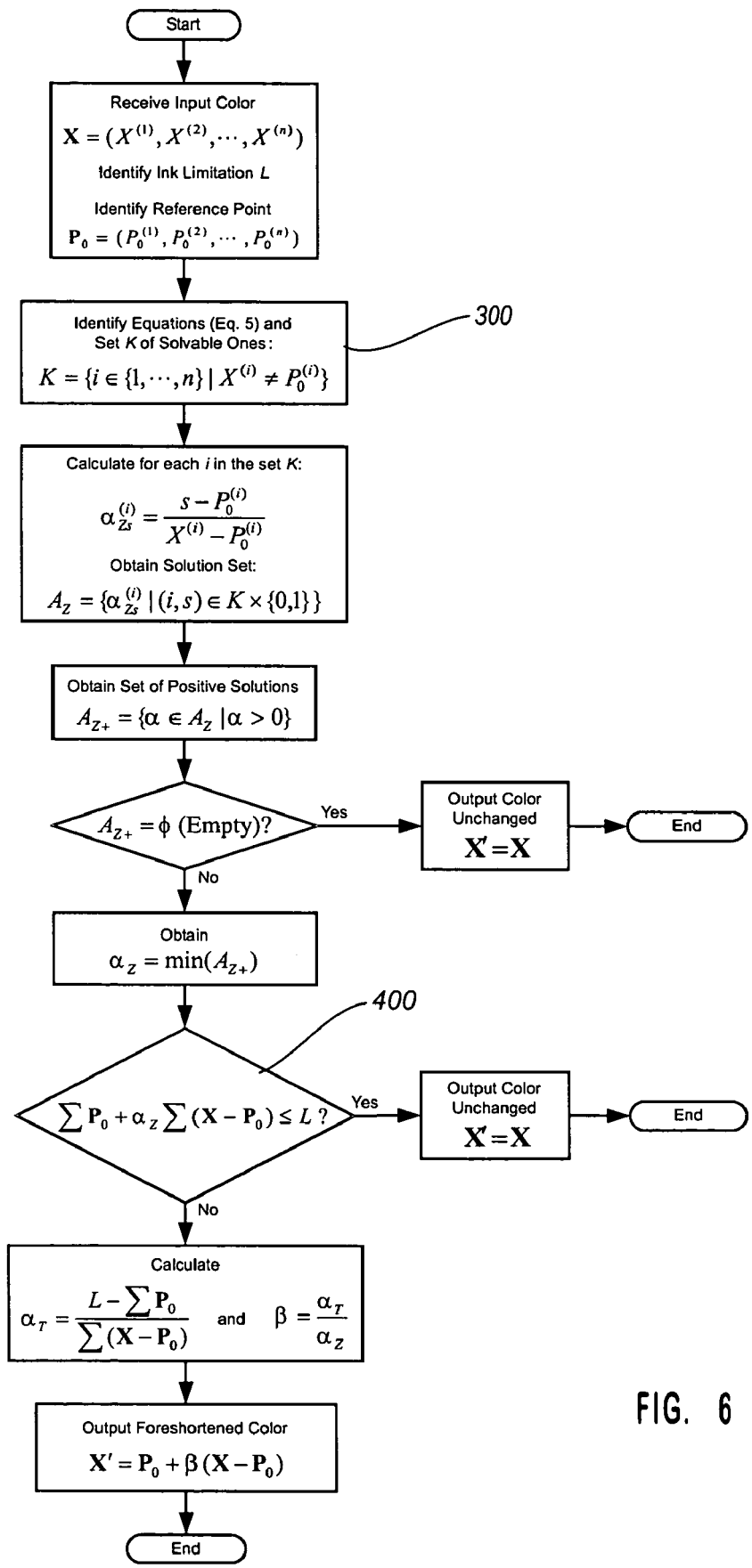
FIG. 6 is a flow chart that illustrates a representative n-dimension embodiment of the present invention.

A representative multi-dimensional (n-dimension) embodiment is explained in relation to FIGS. 5 and 6. The meanings of the labeled points of FIG. 5 are the same as the labeled points of FIG. 4. Bold faced letters denote vectors in n dimensions.

With reference to FIG. 5, the ray emanating from $P_0$ through X is denoted by the following equation:

$$V=P_0+\alpha(X-P_0), \quad \text{(Equation. 1)}$$

In Equation 1, $\alpha$ is a non-negative scalar. Intersection points $I_T$ and $I_Z$ are located on this ray and they are denoted by the following equations:

$$I_T=P_0+\alpha_T(X-P_0), \quad \text{(Equation. 2)}$$

$$I_Z=P_0+\alpha_Z(X-P_0), \quad \text{(Equations. 3)}$$

FIG. 5 illustrates the case where X is within the ink limitation boundary (i.e., the sum of the components of X is less than the ink limit L) and $I_T$ is outside of the line segment from $P_0$ to X. If X is on or outside the ink limitation boundary—for example, within the closed tetrahedron having vertices $P_1$, $P_2$, $P_3$, and D in FIG. 4, which depicts the 3-dimensional case—then $I_T$ will be located within the closed line segment from $P_0$ to X.

To obtain vectors $I_T$ and $I_Z$, the values for $\alpha_T$ and $\alpha_Z$ need to be determined. Since point $I_T$ is on the ink limitation boundary, the sum of the components in vector $I_T$ should equal the ink limitation value L. By rearranging Equation. 2 and summing the vector components on both sides, $\alpha_T$ can be obtained by the following equation:

$$\alpha_T = \frac{L - \sum P_0}{\sum(X-P_0)}, \quad \text{(Equation. 4)}$$

In Equation 4, $\Sigma$ denotes the sum of the vector components.

Now for obtaining a value for $\alpha_Z$, $I_Z$ is located on the boundary of the colorant signal hyper-cube. Every point (position vector) on this boundary (including $I_Z$) contains either a 0 or a 1 (i.e., 100%) component. To obtain $\alpha_Z$, we solve a set of scalar equations of the following form that are derived from the vector equation Equation 3:

$$\begin{bmatrix} s \\ s \\ \vdots \\ s \end{bmatrix} = \begin{bmatrix} X^{(1)} - P_0^{(1)} & 0 & \cdots & 0 \\ 0 & X^{(2)} - P_0^{(2)} & \cdots & 0 \\ \vdots & \vdots & \ddots & \vdots \\ 0 & 0 & \cdots & X^{(n)} - P_0^{(n)} \end{bmatrix} \quad \text{(Equation. 5)}$$

$$\begin{bmatrix} \alpha_{Zs}^{(1)} \\ \alpha_{Zs}^{(2)} \\ \vdots \\ \alpha_{Zs}^{(n)} \end{bmatrix} + \begin{bmatrix} P_0^{(1)} \\ P_0^{(2)} \\ \vdots \\ P_0^{(n)} \end{bmatrix}.$$

Equation 5 represents n scalar equations, for a given value of s. Let s=0 to solve for the $\alpha_{Z0}$'s on the lower boundary of the cube, and set s=1 to solve for the $\alpha_{Z1}$'s on the upper boundary. Let $K=\{i \in \{1, \ldots, n\} | X^{(i)} \neq P_0^{(i)}\}$. The set K comprises the indices of the subset of the scalar equations of Equation 5 that have determinate solutions. (Note that if the ink limit L>n−1, it is not necessary to solve the equations where s=0, and this fact can be exploited in an efficient implementation.)

The solution of Equation 5 is:

$$\alpha_{Zs}^{(i)} = \frac{s - P_0^{(i)}}{X^{(i)} - P_0^{(i)}}, \text{ where } i \in K. \quad \text{(Equation. 6)}$$

Define the set of solutions as:

$$A_Z = \{\alpha_{Zs}^{(i)} | (i,s) \in K \times \{0,1\}\}. \quad \text{(Equation. 7)}$$

In Equation 7, '×' denotes the Cartesian product. Extract the set of positive solutions (if any) as:

$$A_{Z+} = \{\alpha \in A_Z | \alpha > 0\}. \quad \text{(Equation. 8)}$$

If the set $A_{Z+}$ is empty, there is no need to adjust the input signal X and the algorithm terminates, outputting X as the resulting color. If $A_{Z+}$ is non-empty, the smallest positive solution may be determined in the following manner:

$$\alpha_Z = \min(A_{Z+}). \quad \text{(Equation. 9)}$$

In this present case, X needs to be foreshortened whenever $I_Z$ exceeds the ink limit amount. This condition can be denoted by:

$$\Sigma P_0 + \alpha_Z \Sigma(X-P_0) > L, \quad \text{(Equation. 10)}$$

In Equation 10, L is the ink limit amount.

Once it is decided that X needs to be foreshortened, the coefficient for foreshortening can be determined by the ratio of the length of the line segment from $P_0$ to $I_T$ to the length of the segment from $P_0$ to $I_Z$. Since these points are collinear, the ratio of the lengths is invariant to the particular norm (distance metric) we use. The ratio can be obtained by:

$$\beta = \frac{\|I_T - P_0\|}{\|I_Z - P_0\|} = \frac{\alpha_T \|X - P_0\|}{\alpha_Z \|X - P_0\|} = \frac{\alpha_T}{\alpha_Z}. \quad \text{(Equation 11)}$$

The foreshortened X vector can now be obtained by:

$$X' = P_0 + \beta(X - P_0). \quad \text{(Equation. 12)}$$

Based on the description above, FIG. 6 illustrates a flow chart of the representative embodiment. In the representative embodiment of illustrated in FIG. 6, input color is received, an ink limit amount is identified and a reference/anchor point is identified (this is Block 200 in FIG. 6, which corresponds to Blocks 80, 82, and 84 in FIG. 3). At step 300, set K is determined and used to obtain $A_z$. A set of positive solutions is obtained, and then a decision is made as to whether or not the set is empty. If it is empty, the output color is equal to the input color. However, if the set is not empty, $\alpha_Z$ is determined. Then, at decision block 400 another determination is made as to whether or not the specified input color needs to be foreshortened. After decision block 400, it can be determined whether an input color needs to be processed/foreshortened or not. In a 3-dimensional embodiment, this is the same as deciding whether the input color is inside or outside of the closed polyhedron (FIG. 4) having vertices P0, P1, P2, P3, and D. Thus, the processing blocks from 300 to 400 in FIG. 6 correspond to the single Block 86 of FIG. 3. FIG. 6 shows the implementation details of Block 86 in FIG. 3. If the specified input color is inside the closed polyhedron (FIG. 4) having vertices P0, P1, P2, P3, and D, then it will be adjusted via the foreshortening procedure; otherwise, the specified input color is output unchanged. Blocks 500 and 600 in FIG. 6 correspond with Blocks 90 and 92 in FIG. 3 (blocks in FIG. 6 show implementation details and those in FIG. 3 show general concepts).

Those skilled in the art will appreciate that the representative example above, and illustrated in FIGS. 5-6, are representative only. Embodiments of the present invention embrace a variety of manners for dynamically limiting total colorant coverage in multi-colorant subtractive rendering. Further, while the methods and processes of the present invention have proven to be particularly useful in association with ink jet printers, those skilled in the art can appreciate that the methods and processes can be used in a variety of different applications and in a variety of different processes, such as in electrophotographic (EP) engines and any other printing process, to limit the total colorant coverage in multi-colorant subtractive rendering. Examples include printers, copiers, fax machines, plotters, multi-functional peripherals, monitors, etc. that employ multi-colorant subtractive rendering.

Thus, as discussed herein, the embodiments of the present invention relate to multi-colorant rendering. In particular, the present invention relates to systems and methods for dynamically limiting total colorant coverage in a color rendering system. Moreover, the present invention relates to systems and methods for dynamically limiting total colorant coverage in multi-colorant subtractive rendering. Embodiments of the present invention embrace a variety of multi-colorant subtractive rendering systems. In one embodiment, the multi-colorant subtractive rendering system is a printing process that includes a plurality of colorant deposition stations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a color rendering system, a method for dynamically limiting total colorant coverage, the method comprising:
   defining a first volume of a multi-dimensional colorant cube to comprise any colorant combination that exceeds a total coverage limit;
   defining a second volume of the multi-dimensional cube to comprise any colorant combination that is within the total coverage limit;
   identifying a reference point within the second volume to define a third volume of the multi-dimensional cube, wherein the entirety of the third volume is within the second volume;
   defining a foreshort region consisting of the union of the first volume and the third volume; and
   using resultant colors in a color rendering process performed by the color rendering system for all input colors falling within the foreshort region comprising bijectively transforming the input colors into the resultant colors, the resultant colors all lying within the third volume.

2. A method as recited in claim 1, wherein the resultant color comprises a color source.

3. A method as recited in claim 1, wherein the resultant color comprises one of:
   (i) an ink;
   (ii) a toner; and
   (iii) a dye.

4. A method as recited in claim 1, wherein the resultant color comprises one or more pixels.

5. A method as recited in claim 1, wherein the input color is from one of:
   (i) an image;
   (ii) a capture device; and
   (iii) a rasterization process.

6. A method as recited in claim 1, wherein the resultant color is applied to one or more graphic primitive attributes.

7. A method as recited in claim 1, wherein the step for bijectively transforming is performed prior to rasterization.

8. A method as recited in claim 1, wherein the method is used within a process for generating one or more color conversion lookup tables.

9. A method as recited in claim 1, wherein the color rendering system is a subtractive rendering system.

10. A method as recited in claim 9, wherein the subtractive rendering process is a multi-colorant subtractive rendering process.

11. A method as recited in claim 10, wherein the multi-colorant subtractive rendering process is one of:
    a three-colorant subtractive rendering process;
    (ii) a four-colorant subtractive rendering process; and
    (iii) a four-colorant subtractive rendering process, where one colorant is not changed and a three-colorant limit is obtained by subtracting an amount of fixed colorant from a four-colorant limit.

12. A method as recited in claim 1, wherein the step for bijectively transforming the input color of the first region into a resultant color comprises a step for projecting a ray from the reference point to the specified contone color through a plane of the first volume and an outer surface of the multi-dimensional colorant cube.

13. A method as recited in claim 12, wherein the step for bijectively transforming the input color of the first volume into a resultant color further comprises a step for using a ratio between a first length of the ray and a second length of the ray, wherein the first length is from the reference point to an intersection point of the ray with the plane of the first volume, and wherein the second length is from the reference point to an intersection point of the ray with the outer surface of the multi-dimensional colorant cube.

14. A method as recited in claim 1, wherein the color rendering system performs the method on an output medium, wherein the medium is one of:
(i) paper;
(ii) fabric;
(iii) a slide;
(iv) an overhead transparency; and
(ii) a subtractive rendering monitor.

15. A method as recited in claim 1, wherein the color rendering process includes a multi-inking station printing process.

16. A multi-colorant subtractive rendering system comprising:
an output rendering medium having a total area coverage limit;
a rendering mechanism configured to render color on the output rendering medium; and
a processor coupled to the rendering mechanism, wherein the processor is configured to define a first volume of a multi-dimensional colorant cube to comprise any colorant combination that exceeds a total coverage limit, define a second volume of the multi-dimensional cube to comprise any colorant combination that is within the total coverage limit; identify a reference point within the second volume to define a third volume of the multi-dimensional cube, wherein the entirety of the third volume is within the second region volume, define a foreshort region consisting of the union of the first volume and the third volume, and use resultant colors in the color rendering process for all input colors falling within the foreshort region comprising bijectively transforming the input colors into the resultant colors, wherein the resultant colors all lie within the third volume.

17. A system as recited in claim 16, wherein rendering mechanism is a printer coupled to computer device, wherein the computer device comprises the processor.

18. A system as recited in claim 17, further comprising a network, wherein the printer and the computer device are coupled via the network.

19. A system as recited in claim 16, wherein the rendering mechanism and the processor are of a computer device, and wherein the output mechanism is a subtractive rendering monitor of the computer device.

20. A computer program product for implementing within a color rendering system a method for dynamically limiting total colorant coverage, the computer program product comprising: a non-transitory computer readable medium for providing computer program code means utilized to implement the method, wherein the computer program code means is comprised of executable code for implementing the method of: defining a first volume of a multi-dimensional colorant cube to comprise any colorant combination that exceeds a total coverage limit; defining a second volume of the multi-dimensional cube to comprise any colorant combination that is within the total coverage limit; identifying a reference point within the second volume to define a third volume of the multi-dimensional cube, wherein the entirety of the third volume is within the second volume; defining a foreshort region consisting of the union of the first volume and the third volume; and using resultant colors in the color rendering process for all input colors falling within the foreshort region comprising bijectively transforming the input colors into the resultant colors, the resultant colors all lying within the third volume.

21. A computer program product as recited in claim 20, wherein the color rendering system is a multi-colorant subtractive rendering process.

22. A computer program product as recited in claim 21, wherein the multi-colorant subtractive rendering process is one of:
(i) a three-colorant subtractive rendering process;
(iii) a four-colorant subtractive rendering process; and
(iv) a four-colorant subtractive rendering process, where one colorant is not changed and a three-colorant limit is obtained by subtracting an amount of fixed colorant from a four-colorant limit.

23. A computer program product as recited in claim 20, wherein the input color is from one of:
(i) an image;
(ii) a capture device; and
(iii) a rasterization process.

24. A computer program product as recited in claim 20, wherein the step for bijectively transforming the input color of the first volume into a resultant color comprises a step for projecting a ray from the reference point to the specified contone color through a plane of the first volume and an outer surface of the multi-dimensional colorant cube.

25. A computer program product as recited in claim 24, wherein the step for bijectively transforming the input color of the first volume into a resultant color further comprises a step for using a ratio between a first length of the ray and a second length of the ray, wherein the first length is from the reference point to an intersection point of the ray with the plane of the first volume, and wherein the second length is from the reference point to an intersection point of the ray with the outer surface of the multi-dimensional colorant cube.

* * * * *